A. K. LOVELL.
PROCESS FOR THREADING NUTS.
APPLICATION FILED JAN. 11, 1912.
1,114,158.
Patented Oct. 20, 1914.
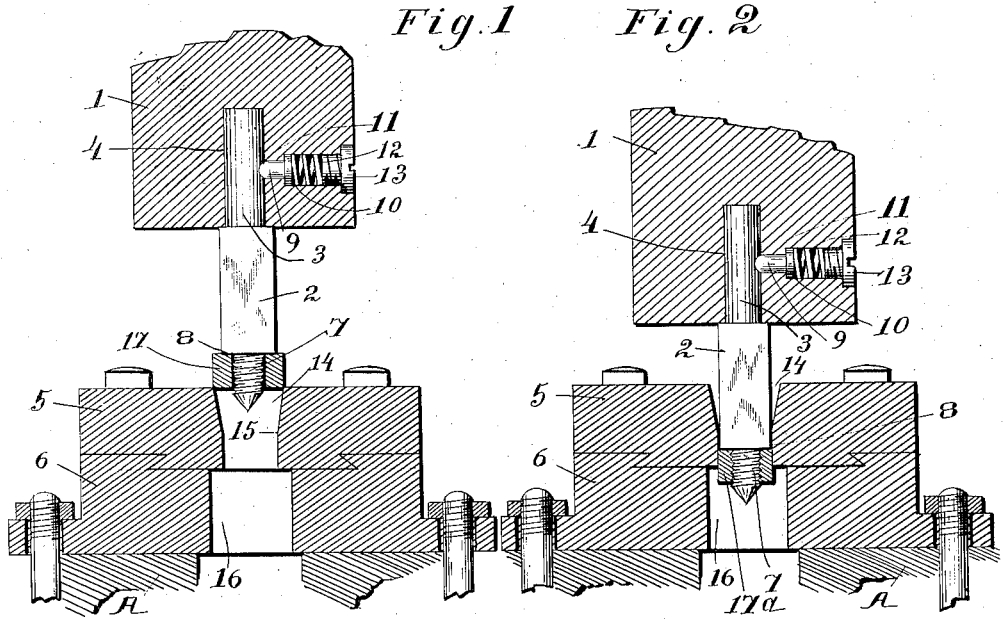
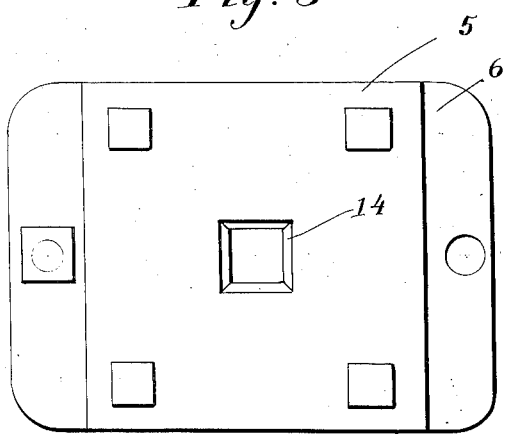
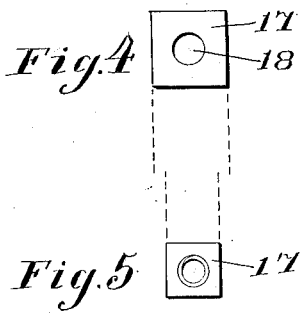
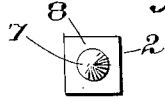
WITNESSES
Linus Barnes
Willis Barnes
INVENTOR
Albert K. Lovell
By George L. Barnes

UNITED STATES PATENT OFFICE.

ALBERT K. LOVELL, OF NEW HAVEN, CONNECTICUT.

PROCESS FOR THREADING NUTS.

1,114,158.  Specification of Letters Patent.  Patented Oct. 20, 1914.

Application filed January 11, 1912. Serial No. 670,720.

*To all whom it may concern:*

Be it known that I, ALBERT KINGMAN LOVELL, a citizen of the United States of America, and resident of New Haven, in the county of New Haven and State of Connecticut, have invented certain new and useful Improvements in Processes for Threading Nuts, of which the following is a specification.

My invention relates to an improved method or process for threading nuts for bolts.

The present process consists of the well known method universally employed of cutting the thread by means of a suitable tap or cutting tool revolved within the nut blank, and thereby removing the material of the blank to form the groove which makes the thread. The said process is slow and expensive, especially in tapping the smaller sizes of nuts which involves the breakage of the small and highly tempered tools required. It is further objectionable in that it abrades to some extent the surface of the thread, particularly its edge or exterior angle.

My process contemplates the direct and complete formation of the thread by means of exterior compression of the nut blank around and upon a threaded former, and compacting and elongating the molecules of the stock without removal or waste of the materials, thereby producing a tougher and superior thread, with smoothed and hardened surface.

In the accompanying drawings forming a part of this specification, Figure 1 is a vertical cross section of the punch holder of the usual commercial power press used in machine shops, and a thread former and compression die for carrying out my improved process for threading nuts, with a nut blank in position for operation. Fig. 2 is a similar view with the parts in the position of a later stage in the process with the nut threaded, and ready for removal from the former. Fig. 3 is a plan view of the die used for carrying out this improved process. Fig. 4 is a plan view of a nut blank prior to compression, and Fig. 5 is a similar view of a finished nut, after removal from the compression die. Fig. 6 is an end view of the thread former.

In carrying out my improved process for threading nuts, any ordinary suitable form of power press may be employed, here requiring no description, nor illustration except its relation to the special appliances for forming the nut threads, for which purpose the punch holder or vertically reciprocating gate is shown, and designated by the numeral 1 on the drawings. Said nut threading appliances comprise in their simplest form a thread former 2 the shank 3 of which is received and held in a socket 4 in the lower end of the gate, 1, and a compression die 5 which is bolted or otherwise secured to the die bed 6, which as usual is bolted to the bed of the press A here denoted by the broken sectional shading shown, but requiring no further description or delineation.

The thread former 2, below its shank 3 is of cross sectional form of the transverse configuration of the finished nut, that is, square or hexagonal, as the case may be, and of somewhat slightly less area, as shown in Fig. 2. Below said part, is a central cylindrical, conically pointed "teat" or part 7, screw threaded to conform to the required threads of the nut, and resembling a pointed bolt in external appearance, as shown. Said screw threaded "teat" is hardened to the degree usual for taps and similar cutting tools, and the base of the former, above the "teat" or shoulder 8 at the junction of the two parts is correspondingly hardened, and endowed with thrust resisting capacity for the purpose hereinafter more fully explained. The shank of the thread former is held in the punch holder of the press by a horizontal spring actuated catch 9 seated in a cavity 10 of the holder, and adapted to engage a notch 11 in the shank. The spring 12 for actuating the catch is a coiled elastic wire, compressed to a state of tension by a set screw 13 screwed into the cavity 10 as shown.

The compression die 5 is formed with a central vertical matrix or passage 14 passing entirely through it and having its cross sectional configuration exactly that of the nut blank to be threaded, that is, in the present instance, square. At the upper face of the die the opening of the passage is of slightly larger area than that of the nut blank to be threaded, being increased just sufficiently over the size of the blank to enable the blank to slightly enter it. From said opening the walls of the passage converge downwardly or taper inwardly a certain distance, to the horizontal cross plane 15 shown in Fig. 1. From said cross plane of the termination of the tapering part of the matrix downwardly the passage is formed with parallel sides, and is throughout uniformly of the same dimensions as the lower terminal of the tapered part at the cross plane 15. The area of the perpendicularly sided part of the passage is therefore reduced from that of the upper opening for the purpose hereinafter stated. The die bed is also made with a vertical passage 16 through it, somewhat larger than the lower opening of the die proper.

With mechanism constructed as hereinbefore described and shown my improved nut threading process may be carried out in practical operation as follows: The nut blank 17 having been formed with a central circular perforation 18 as shown in Fig. 4, of a size to freely admit the threaded "teat" 7 of the thread former, is first placed at the upper opening of the passage 14 of the compression die 5 substantially in the axial line of the thread former and resting on the taper walls of the passage as shown in Fig. 1. Then with the downward stroke of the press gate the "teat" of the thread former will enter the blank until the shoulder 8 engages the upper surface of the blank, after which the continued downward movement of the thread former by the thrust of the shoulder 8 will force the nut blank down through the die. In such passage through the die the nut blank will be closed in and upset between the converging walls of the passage and compressed upon and around the threads of the thread former, thereby being shaped thereto, as shown in Fig. 2, and provided with a corresponding internal thread, thus transforming the blank into a finished nut 17ª, as shown in Fig. 5. After the nut has been forced completely through the die it may be unscrewed from the thread former and the operation repeated.

While the uniform sized and parallel sided part of the passage through the die below the cross plane 15 is of neutral effect in the positive compression of the nut blank, and therefore possible of being dispensed with it is nevertheless important to the process, steadying the nut in the final stage of its compression as it is about to leave the tapering part of the passage, and producing a smoother and more uniformly proportioned nut, with straighter and more parallel sides. The amount of such uniform extension of the smallest area of the passage may vary considerably but should preferably correspond to the depth of the nut.

In the initial entrance of the thread former into the nut blank, the positioning of the blank with reference to the die will be insured by the conical point upon the lower end of the "teat" of the thread former, which will engage the blank and centralize it if the eccentricity is less than the semi-diameter of the "teat". It will readily be seen that a plurality of nuts may be threaded by this process at a single operation, by means of proportionate extension of the threaded portion or "teat" of the thread former.

More elaborate and automatic mechanism may be provided for the manufacture of the product on a more extensive scale, but the principles of the process are embodied in the appliances shown and will readily be understood without additional illustration.

By the compression of the material of the nut blank into the space around the threads of the thread former the finished nut will be of reduced size from that of the nut blank, corresponding to the difference between the maximum and minimum cross sectional areas of the matrix of the die, as indicated by the dotted dimension lines of Figs. 4 and 5.

In this process as hereinbefore explained, it will be observed that the metal comprising the nut blank is pushed or pressed into the tapering seat of the matrix by the thrust of the shoulder of the thread former, before which it advances and that a compressing strain is therefore imposed upon the particles of the blank throughout its entire body. This action insures the flow of the metal into the thread grooves of the former, and shapes the nut threads accurately and sharply. The shoulder of the thread former in operation prevents the flow or escape of the metal in the direction of the mouth of the die, hence the particles will be compressed into the thread grooves as stated. Mechanism for pulling the nut blank through the die, or the reverse operation of that hereinbefore described will fail of accomplishing this object, and will only draw out, break or attenuate the body of the blank, without tendency to shape the thread thereon. The importance of compression therefore as distinguished from tensile strain on the nut blank will be obvious.

I claim as my invention:

1. The herein described process of threading nuts consisting essentially of pressing the nut blank through a tapering matrix by pressure applied against the back or following face of the nut blank as distinguished from its front or leading side in its passage through the die or matrix and simultaneously carrying with it a screw threaded former within the blank, upon and around which the blank will be compressed and internally threaded, substantially as specified.

2. The herein described process of threading nuts consisting essentially of pressing the nut blank through a tapering passage in a die, by a forcing tool engaging the blank and having a screw threaded former projected within the blank, around and upon which the blank will be compressed and shaped, and thereby correspondingly internally threaded, substantially as specified.

3. The herein described process of threading nuts consisting essentially of compressing the blank into a tapering matrix by pressure applied upon the metal mass on the retreating side as distinguished from the advancing side, and simultaneously advancing a screw threaded former with the blank, within the perforation thereof, and around and upon which the metal will be compressed and shaped and the nut thereby internally threaded, substantially as specified.

Signed by me at New Haven, this 8th day of January, 1912.

ALBERT K. LOVELL.

Witnesses:
GEORGE L. BARNES,
ALBERT McC. MATHEWSON.